(12) United States Patent
Conte (10) Patent No.: US 8,582,502 B2
(45) Date of Patent: Nov. 12, 2013

(54) ROBUST MULTIPATH ROUTING

(75) Inventor: Thomas M. Conte, Atlanta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 740 days.

(21) Appl. No.: 12/478,614

(22) Filed: Jun. 4, 2009

(65) Prior Publication Data

US 2010/0309841 A1    Dec. 9, 2010

(51) Int. Cl.
*H04L 12/56* (2006.01)
*H04W 40/02* (2009.01)

(52) U.S. Cl.
USPC .......................... 370/328; 370/400; 370/406

(58) Field of Classification Search
None
See application file for complete search history.

(56) References Cited

U.S. PATENT DOCUMENTS

| | | | |
|---|---|---|---|
| 6,304,556 B1 | 10/2001 | Haas | |
| 6,868,083 B2* | 3/2005 | Apostolopoulos et al. | 370/392 |
| 6,901,074 B1* | 5/2005 | Yamasaki | 370/400 |
| 7,181,206 B2* | 2/2007 | Pedersen | 455/425 |
| 7,185,104 B1* | 2/2007 | Thorup et al. | 709/235 |
| 7,444,506 B1* | 10/2008 | Datta et al. | 713/153 |
| 7,706,276 B2* | 4/2010 | Lin et al. | 370/235 |
| 2001/0054110 A1* | 12/2001 | Kikinis | 709/239 |
| 2002/0110097 A1* | 8/2002 | Sugirtharaj et al. | 370/329 |
| 2003/0202468 A1 | 10/2003 | Cain et al. | |
| 2006/0031576 A1 | 2/2006 | Canright | |
| 2006/0155856 A1* | 7/2006 | Nakashima et al. | 709/227 |
| 2006/0221930 A1* | 10/2006 | Sweeney et al. | 370/351 |
| 2007/0153729 A1* | 7/2007 | Alapuranen | 370/329 |
| 2007/0165516 A1* | 7/2007 | Xu et al. | 370/217 |
| 2008/0089228 A1 | 4/2008 | Lin et al. | |
| 2008/0151917 A1* | 6/2008 | Bartlett et al. | 370/401 |
| 2009/0307732 A1* | 12/2009 | Cohen et al. | 725/87 |

FOREIGN PATENT DOCUMENTS

| | | |
|---|---|---|
| DE | 10140446 A1 | 3/2003 |
| DE | 102005023322 A1 | 11/2006 |

OTHER PUBLICATIONS

Emin Gabrielyan, Reliable Multi-Path Routing Schemes for Voice over Packet Networks, International Conference on Internet Surveillance and Protection, Aug. 26-29, 2006, Cap Esterel, Cote d'Azur, France.

Djamel Djenouri, Othmane Mahmoudi, Mohamed Bouamama, David Llewellyn-Jones, Madjid Merabti, on Securing MANET Routing Protocol Against Control Packet Dropping, pp. 100-108, IEEE International Conference on Pervasive Services, Jul. 15-20, 2007, Istanbul, Turkey.

Dan Berger, Zhenqiang Ye, Prasun Sinha, Srikanth Krishnamurthy, Mickalis Faloutsos, Satish K. Tripathi, TCP-Friendly Medium Access Control for Ad-Hoc Wireless Networks: Alleviating Self-Contention, White Papers, Institute of Electrical and Electronics Engineers, Oct. 2004.

Bo Yan, Hamid Gharavi, Multi-Path Multi-Channel Routing Protocol, Proceedings of the Fifth IEEE International Symposium on Network Computing and Applications, pp. 27-31, Jul. 24-26, 2006, Cambridge, MA, USA.

Andrew Jenkins, Daniel Henkel, Timothy X Brown, Sensor Data Collection through Unmanned Aircraft Gateways, AIAA Infotech at Aerospace 2007 Conference and Exhibit, May 2007, Rohnert Park, CA, USA.

(Continued)

*Primary Examiner* — Min Jung (74) *Attorney, Agent, or Firm* — Brundidge & Stanger, P.C.

(57) ABSTRACT

Implementations related to robust multipath routing are disclosed.

30 Claims, 4 Drawing Sheets

(56) References Cited

OTHER PUBLICATIONS

Fan Wu, Sheng Zhong, Jiqiang Liu, Cost-Effective Traffic Assignments for Multipath Routing in Selfish Networks, Global Telecommunications Conference GLOBECOM '07, Nov. 26-30, 2007, Washington, D.C., USA.

The Byzantine Generals Problem, http://pages.cs.wisc.edu/~sschang/OS-Qual/reliability/byzantine.htm, Jul. 1982.

International Preliminary Report on Patentability for International Application No. PCT/US2010/037266 mailed on Dec. 15, 2011.

International Search Report and Written Opinion for International Application No. PCT/US2010/037266 mailed on Sep. 8, 2010.

* cited by examiner

500 A computer program product.

502 A signal bearing medium.

504 at least one of one or more instructions for receiving a packet stream at a first node;

one or more instructions for identifying a subset of packets of the packet stream;

one or more instructions for determining a first route for transmitting packets of the packet stream other than the subset of packets from the first node to a second node;

one or more instructions for determining a second route for transmitting the subset of packets from the first node to the second node;

one or more instructions for identifying at least one of a TCP acknowledgement (ACK) packet, a Request to Send (RTS) packet, a Clear to Send (CTS) packet, or a packet bearing an urgent pointer;

one or more instructions for performing a multipath routing algorithm using a first value for a weighting variable;

one or more instructions for performing the multipath routing algorithm using a second value for the weighting variable;

one or more instructions for identifying one or more important packets of the stream of packets;

one or more instructions for generating at least one copy of a packet of the subset of packets; or one or more instructions for determining a third route for transmitting the at least one copy of a packet from the first node to the second node.

| 506 a computer-readable medium. | 508 a recordable medium. | 510 a communications medium. |

ROBUST MULTIPATH ROUTING

BACKGROUND

Networks typically provide multiple potential transmission paths from a source to a destination. For example, communication between a personal computer in Boston and a server in Los Angeles may be routed over a ten different (and equally reasonable) paths depending upon how the network is configured and the current traffic loading on each link among the intervening nodes. Routing on the Internet is typically done using a single path selected from among multiple available paths with the chosen path determined by various network administrators. The motivation behind such "ad hoc" routing is to simplify network management, reduce the need to update routing tables at the various nodes, etc., with the overall goal being more efficient network utilization.

Rather than selecting a single path for a communication session, some wired networks utilize multiple paths for a single session. For example, Asynchronous Transfer Mode (ATM) networks may quickly select among different paths to achieve responsive load balancing as well as to rapidly respond to network faults. In addition, the Open Shortest Path First (OSPF) protocol is intended to optimize multipath routing in Internet communications. However, the adaptation speed of OSPF is relatively low and OSPF is not generally used within a single TCP/IP (Transmission Control Protocol/Internet Protocol) stream.

Wireless ad hoc networks typically include a self-configuring array of nodes that combine RF (Radio Frequency) transceivers with processing capability and in some cases sensors. However, the expansion of ad hoc networks into vehicles and buildings introduces the problem of managing heterogeneous ad hoc networks with multipath routing where there are multiple administrative domains. Some of the problems introduced by this environment include the need to manage power consumption at each node, differing goals for performance optimization between the multiple administrative domains, and security concerns presented by un-trusted "men in the middle".

Multipath routing algorithms have been proposed for optimizing performance in wireless ad hoc networks where each administrative domain may seek to optimize routing based on its own internal optimization goals but not necessarily in keeping with the optimization goals of other domains in the network. Networks managed in accordance with such schemes are commonly termed "selfish".

However, such routing algorithms do not address the problem of malicious nodes in a network. In other words, routing algorithms typically assume all nodes in the network act in a "rational" manner and can be persuaded to forward network traffic if an appropriate incentive is provided. However, malicious nodes have different incentive structures that are non-rational in the context of the algorithm and are therefore not taken into account by typical routing algorithms. In light of the disclosure below, those skilled in the art will recognize that this problem is one form of the well-known "Byzantine Generals" problem.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to multipath routing in ad hoc wireless networks.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art in light of the present disclosure will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

Figure 1:
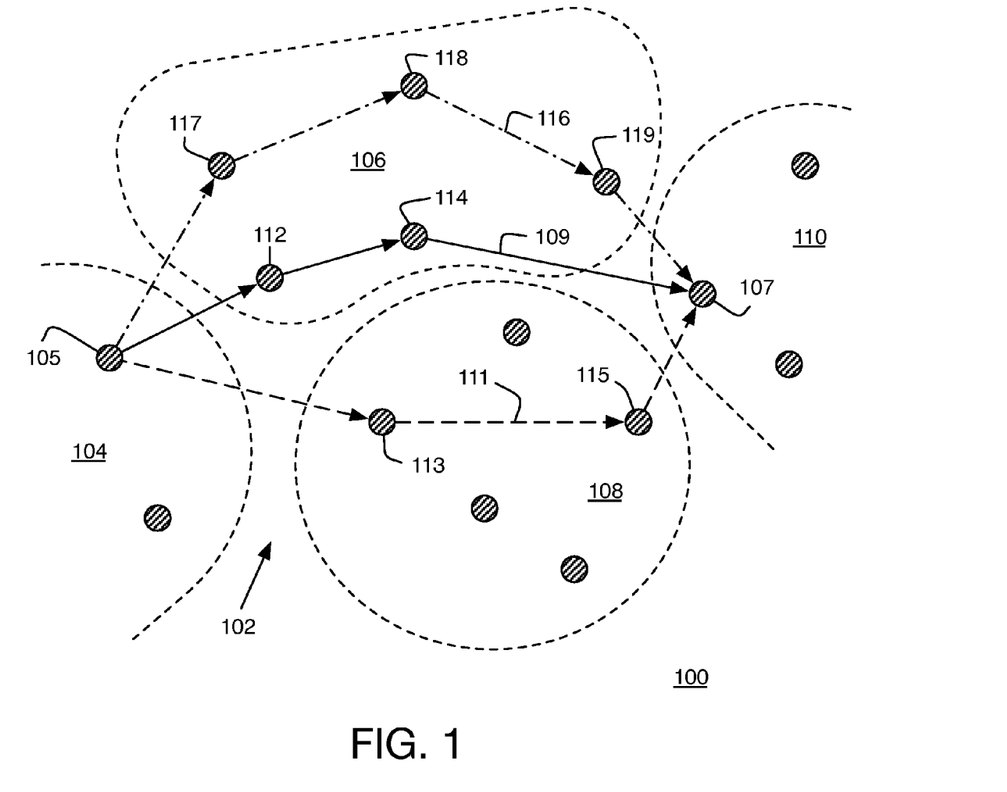
FIG. 1 illustrates an example wireless ad hoc network environment.

FIG. 1 illustrates an example wireless ad hoc network environment 100. Environment 100 includes wireless nodes 102 forming networks 104-110. In the example of FIG. 1, networks 104-110 are packet-switched networks that operate in accordance with the well-known Transport Control Protocol/Internet Protocol (TCP/IP) protocol suite. However, claimed subject matter is not limited to specific network types and/or specific network protocols, for example, network environment 100 may include a mesh network. Each network 104-110 in FIG. 1 may also represent a different administrative domain. For example, different administrative domains may be associated with distinct departments within a company, neighbors in different homes, or different sensor networks that happen to be in close proximity, etc.

Consider a source node 105 in network 104 that seeks to communicate a stream of packets with a destination node 107 in network 110. As can be seen in FIG. 1, there are multiple potential paths available for such a communication session, for example: path 109 shown as solid lines linking node 105 to node 107 via intervening nodes 112 and 114; and path 111 shown as dashed lines linking node 105 to node 107 via intervening nodes 113 and 115.

In the example of environment 100, nodes 105 and 107 reside in networks 104 and 110 respectively. And networks 104 and 110 are different from the networks 106 and 108 that include nodes 112 and 114 and nodes 113 and 115 respectively. Further, in this example, nodes in networks 104,106 and 110 can be expected to forward packets they receive, while network 108 represents a potentially malicious and/or selfish network where nodes may engage in malicious behavior such as spying on packets or selfish behavior such as dropping packets. Hence, if path 111 is chosen to convey a stream of packets from node 105 to node 107, then those packets may be subjected to malicious or selfish acts when passing through nodes 113 and 115 in network 108. As those skilled in the art in light of the present disclosure will recognize, node 105 may employ multipath routing algorithms to select a pathway, such as path 109 and/or path 111, to convey packets from node 105 to node 107.

Nodes 102 of FIG. 1 may represent any of a large variety of wireless network nodes including, but not limited to, mobile computers, sensor nodes, etc. Those skilled in the art in light of the present disclosure will recognize that each node in a wireless ad hoc network environment, such as environment 100, may be a mobile platform including a router with one or more hosts, or network devices, bearing an IP host address or addresses, and wireless communications devices such as receivers and transmitters (or transceivers), etc. Claimed subject matter is not limited, however, to specific node types and/or configurations.

Figure 2:
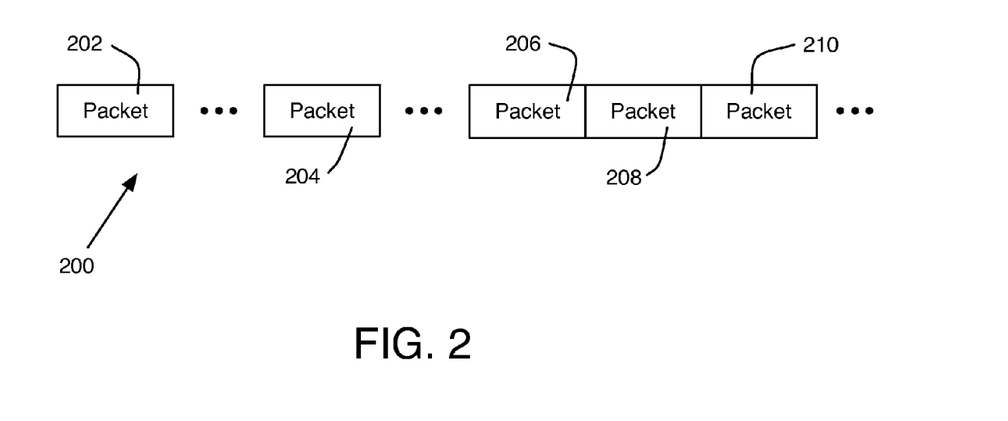
FIG. 2 illustrates an example stream of data packets.

FIG. 2 illustrates an example stream 200 of encrypted data packets 202-210. For example, packets 202-210 may be TCP packets although claimed subject matter is not limited in this respect. In FIG. 2, packets 202 and 204 are part of the header portion of stream 200 and packets 206-210 represent data packets. In accordance with implementations of claimed subject matter, a stream of packets to be conveyed between nodes 105 and 107 may be analyzed by the originating node (e.g., node 105) to determine which packets in a given message stream are more important than other packets. For example, in the TCP protocol, TCP acknowledgment (ACK) packets, other control packets such as Request to Send (RTS) and Clear to Send (CTS) packets, packets bearing urgent pointers, etc. may be considered more important than, for example, data packets in the same stream.

In the example of FIG. 2, packet 204 represents a TCP ACK packet and, as such, may be identified by node 105 of FIG. 1 as an important packet. Those skilled in the art in light of the present disclosure will recognize that FIG. 2 has been provided for explanatory purposes and is intended to provide a simplified depiction of wireless communications packets. For example, although not depicted as differently sized in FIG. 2, those skilled in the art in light of the present disclosure will recognize that in a TCP stream, ACK packet 204 would typically be much smaller (i.e., contain less information) than any of data packets 206-210.

Once identified, the important packet or packets are then transmitted along a different path than the other, non-important, packets. For example, node 105 may identify packet 204 as being important and therefore may transmit packet 204 to node 107 using path 109 while transmitting packets 202 and 206-210 to node 107 using path 111, where node 105 had previously identified path 111 as an optimal path using a multipath routing algorithm. Therefore, in addition to transmission of a message over a transmission pathway selected using a multipath routing scheme, implementations of claimed subject matter include selecting one or more packets of the message for transmission over a different pathway to avoid sending all packets of the message over a single transmission pathway. In some implementations, such selective or differential routing of important packets may be accomplished by changing the weighting variable associated with those packets in a multipath routing algorithm. In other words, for example, node 105 may, when selecting routes for transmission using a multipath routing algorithm, use one weighting variable value to select a transmission path for packets 202 and 206-210 and use a different weighting variable value to select a transmission path for packet 204.

Further, important packets identified in a packet stream may also be duplicated and the duplicate packet(s) sent over different paths. For example, consider the case where network 108, intentionally or not, forwards most of the traffic that it sees but occasionally drops or does not forward a small number of TCP ACK packets. Thus, while path 111 may appear to be reliable, transmission efficacy may suffer because ACK packets are important to TCP/IP network performance. Hence, referring again to FIG. 1, having identified path 111 as optimal and packet 204 as important, node 105 may also make a copy of packet 204 and then may transmit the copy of packet 204 to node 107 over a third path 116 (illustrated with dotted lines in FIG. 1 and traversing nodes 117, 118 and 119) while transmitting the original version of packet 204 over path 109 and the remaining packets 202 and 206-210 over path 111.

Figure 3:
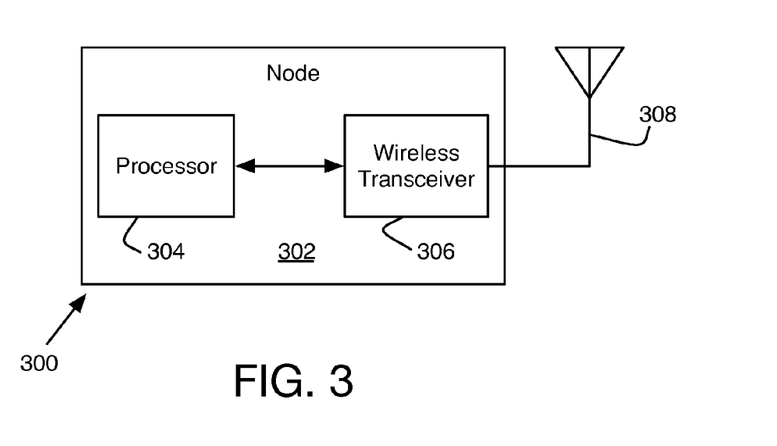
FIG. 3 illustrates an example system.

FIG. 3 illustrates an example system 300 for wireless networking in accordance with some implementations of claimed subject matter. System 300 may be used to perform some or all of the various functions discussed above in connection with FIGS. 1 and 2. System 300 may include any device or collection of devices capable of undertaking wireless communications in a network. For example, system 300 may include selected components of a mobile platform such as a mobile computer, a sensor node of a sensor network etc., although claimed subject matter is not limited to in this regard.

System 300 includes a node 302 having a processor 304, an RF transceiver 306 and an antenna 308. Node 302 may include additional items such as memory, a router, network interface logic etc. that have not been shown in FIG. 3 in order to avoid obscuring claimed subject matter. Processor 304 may include any processing logic capable of providing the functionality described herein and claimed subject matter is not limited to specific types or manifestations of processing logic. For example, processor 304 may be a microprocessor or Central Processing Unit (CPU). In other implementations, processor 304 may be an Application Specific Integrated Circuit (ASIC), a Field Programmable Gate Array (FPGA), a digital signal processor (DSP), or other integrated formats. Further, antenna 308 may be any suitable antenna including but not limited to dish, parabolic, panel, sector, directional, omnidirectional, etc. Also, while an RF transceiver 306 is illustrated in FIG. 3, claimed subject matter is not limited in this regard and node 302 may, for example, employ discrete RF receiver and RF transmitter circuitry.

Figure 4:
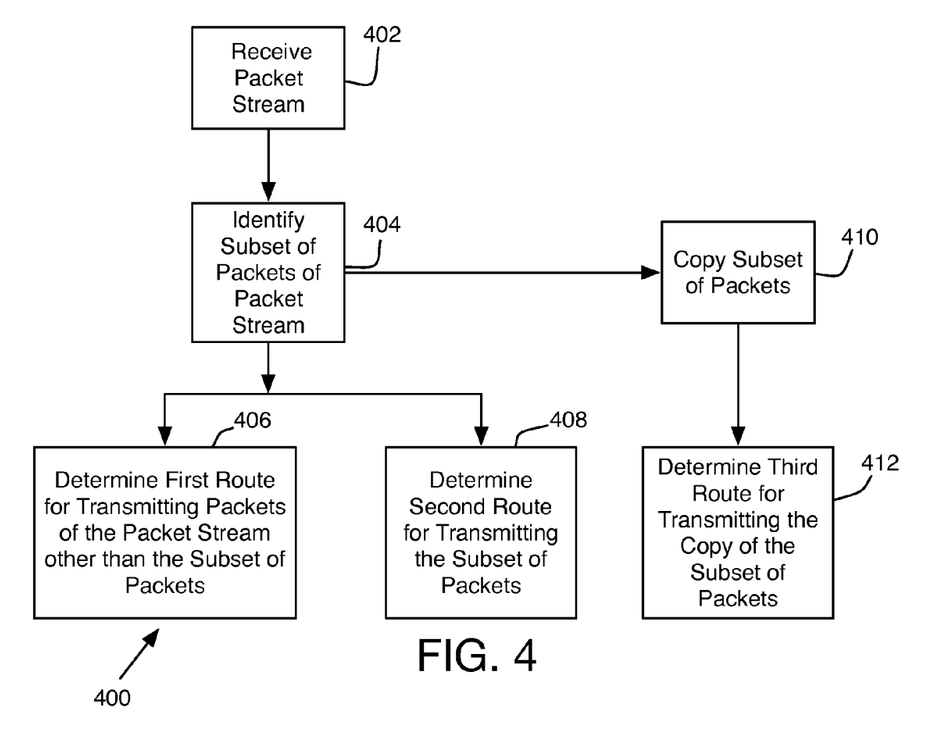
FIG. 4 illustrates an example method.

FIG. 4 illustrates an example process 400. Process 400 sets forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 4 may be practiced in accordance with claimed subject matter.

Process 400 begins with receiving a stream of packets at block 402. Referring to FIGS. 1-3, block 402 may involve node 105, implemented as node 302 of system 300, receiving a packet stream for transmission to node 107. Alternatively, block 402 may involve node 105 generating a packet stream for transmission to node 107. The process of a network node receiving or generating a stream of packets for subsequent transmission is well known and will not be described in further detail herein.

In block 404, a subset of one or more packets may be identified. In some implementations, block 404 may involve, for example, processor 304 of node 302 analyzing the stream of packets generated or received in block 402 to identify a subset of packets. In the context of FIG. 1, node 105 may undertake block 404. In the example of a TCP/IP network, the subset of packets identified in block 404 may include, for example, control packets such as TCP ACK packets, etc as described above. Hence, in a TCP/IP network, block 404 may involve processor 304 identifying one or more TCP ACK packets in a stream of packets. As noted previously, claimed subject matter is not limited to specific communication protocols, hence, block 404 may involve identifying important packets such as control packets, handshake packets, etc. associated with any communications protocol.

Process 400 continues with blocks 406 and 408. In block 406, a route may be determined for transmitting packets of the stream of packets other than the subset of packets identified in block 404. In block 408, a route may be determined for transmitting the subset of packets identified in block 404 where the route determined in block 408 is different than the route determined in block 406. In the context of FIG. 3, processor 304 may undertake block 406 using a multipath routing scheme employing one value of a weighting variable to determine a path for transmitting packets other than the subset of packets, and may undertake block 408 using a different value of the weighting variable to determine a separate path for transmitting the subset of packets. For example, in the context of FIG. 1, block 406 may involve node 105 determining route 116 for transmission of packets other than the subset of packets to node 107, while block 408 may involve node 105 determining route 109 for transmission of the subset of packets to node 107.

Process 400 may also include block 410 in which one or more duplicates of the subset of packets identified in block 404 are generated. In the context of FIG. 3, processor 304 may undertake block 404 using well known methods. Process 400 may continue in block 412 with the determination of a third route for transmitting the copies of the subset of generated in block 410. Block 412 may involve using a multipath routing scheme employing a third value of a weighting variable to determine a route for transmitting copies of the subset of packets where the identified route is different from the paths determined in blocks 406 and 408. For example, in the context of FIG. 1, block 412 may involve node 105 determining route 111 for transmission of copies of packets of the subset of packets to node 107.

Figure 5:
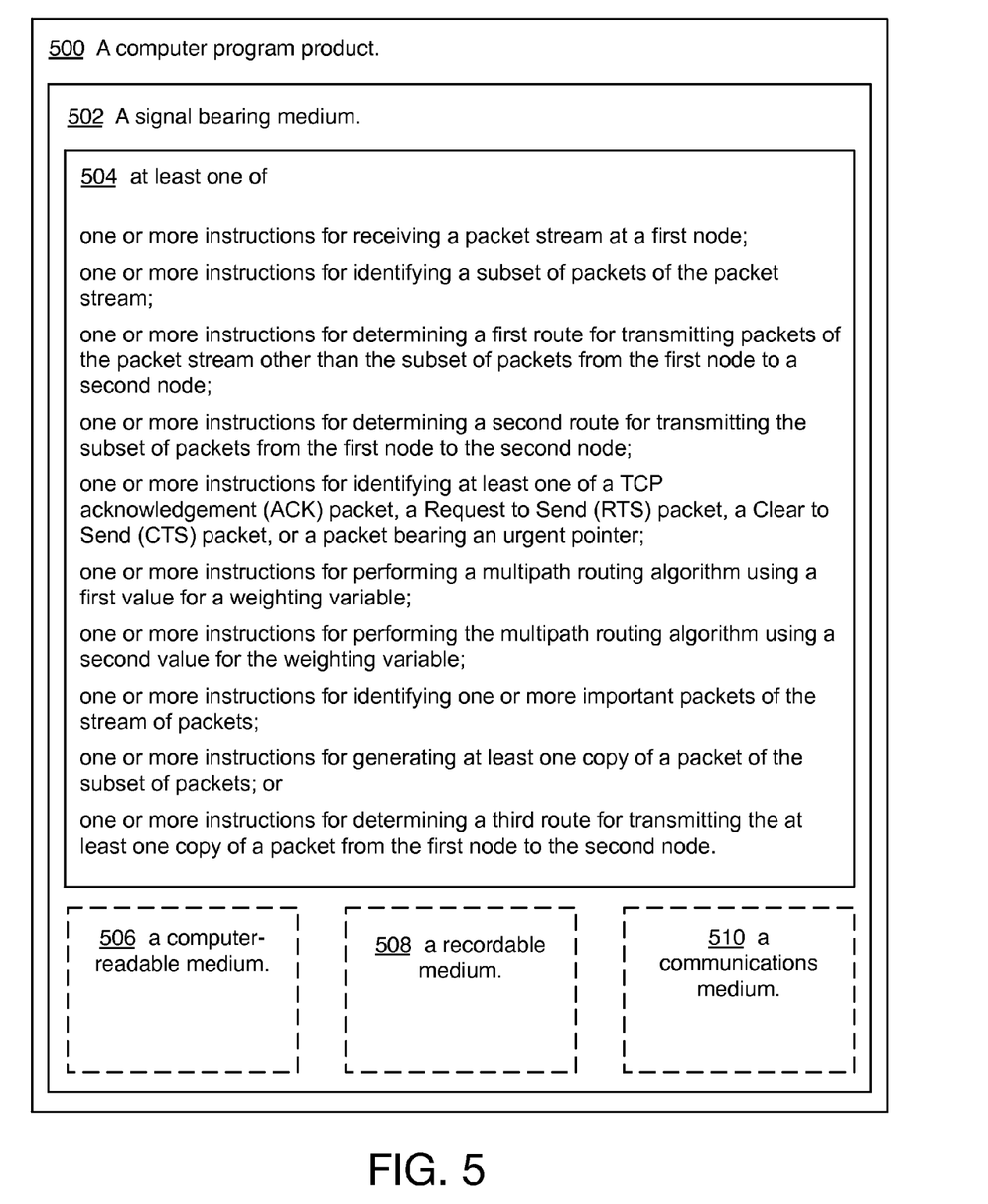
FIG. 5 illustrates an example computer program product.

FIG. 5 illustrates an example computer program product 500. Program product 500 includes a signal bearing medium 502. Signal bearing medium 502 includes one or more instructions 504 that, when executed by, for example, a processor, may provide the functionality described above with respect to FIGS. 1-4. Thus, for example, referring to the system of FIG. 3, processor 304 may undertake one or more of the functional blocks shown in FIG. 4 in response to instructions 504 conveyed by medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, referring to the system of FIG. 3, program product 500 may be wirelessly conveyed to processor 304 (via antenna 308 and wireless transceiver 306) by an RF signal bearing medium 502, where the signal bearing medium 502 is conveyed to system 300 by a wireless communications medium 510 (e.g., an 802.11 wireless communications medium).

Figure 6:
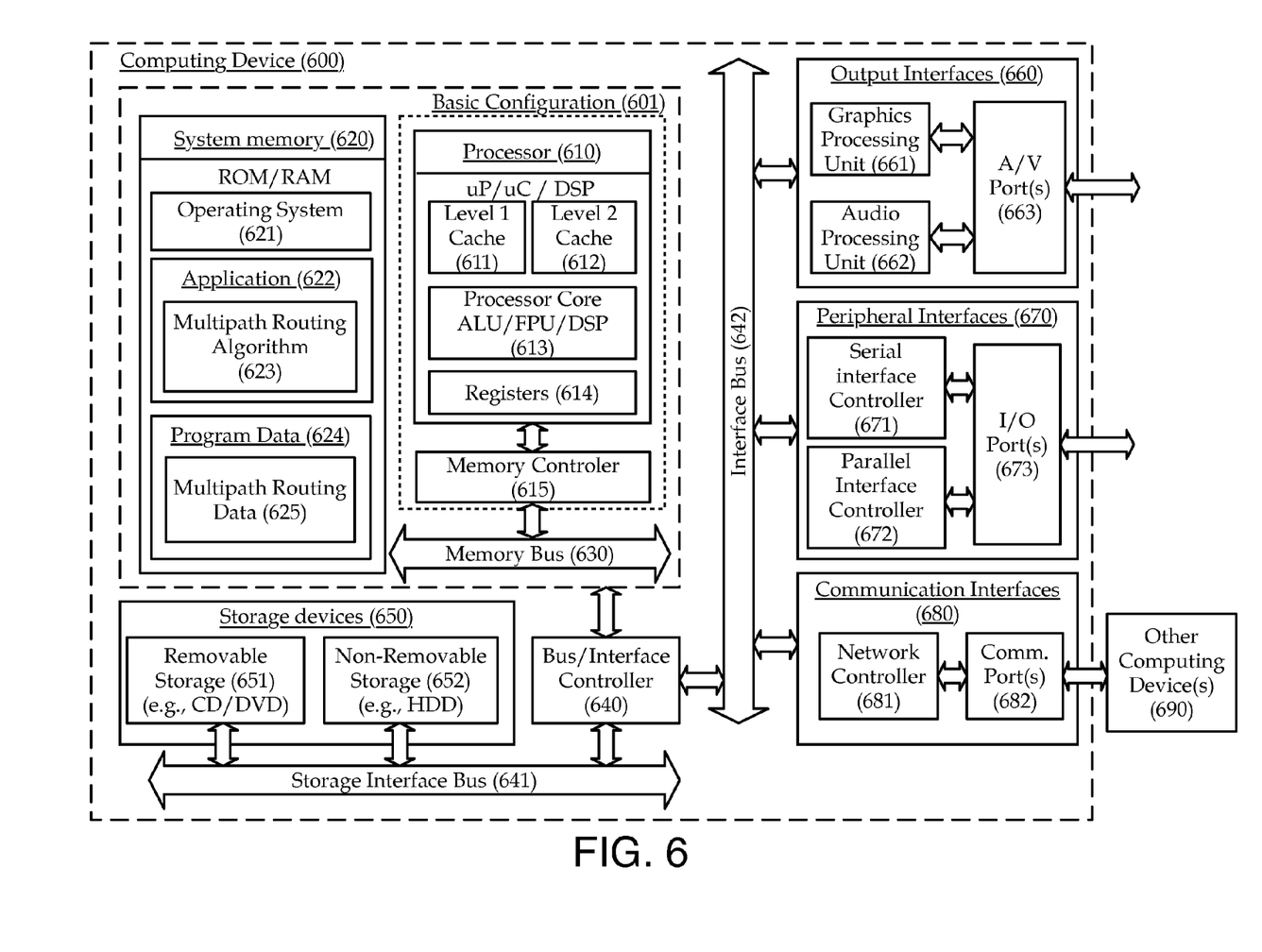
FIG. 6 illustrates an example computing device.

FIG. 6 is a block diagram illustrating an example computing device 600 that is arranged for multipath routing in accordance with the present disclosure. In a very basic configuration 601, computing device 600 typically includes one or more processors 610 and system memory 620. A memory bus 630 can be used for communicating between the processor 610 and the system memory 620.

Depending on the desired configuration, processor 610 can be of any type including but not limited to a microprocessor (µP), a microcontroller (µC), a digital signal processor (DSP), or any combination thereof. Processor 610 can include one more levels of caching, such as a level one cache 611 and a level two cache 612, a processor core 613, and registers 614. The processor core 613 can include an arithmetic logic unit (ALU), a floating point unit (FPU), a digital signal processing core (DSP Core), or any combination thereof. A memory controller 615 can also be used with the processor 610, or in some implementations the memory controller 615 can be an internal part of the processor 610.

Depending on the desired configuration, the system memory 620 can be of any type including but not limited to volatile memory (such as RAM), non-volatile memory (such as ROM, flash memory, etc.) or any combination thereof. System memory 620 typically includes an operating system 621, one or more applications 622, and program data 624. Application 622 includes a multipath routing algorithm 623 that is arranged to perform the functions as described herein including those described with respect to process 400 of FIG. 4. Program Data 624 includes multipath routing data 625 that is useful for implementing multipath routing algorithm 623. In some example embodiments, application 622 can be arranged to operate with program data 624 on an operating system 621 such that implementations of robust multipath routing may be provided as described herein. This described basic configuration is illustrated in FIG. 6 by those components within dashed line 601.

Computing device 600 can have additional features or functionality, and additional interfaces to facilitate communications between the basic configuration 601 and any required devices and interfaces. For example, a bus/interface controller 640 can be used to facilitate communications between the basic configuration 601 and one or more data storage devices 650 via a storage interface bus 641. The data storage devices 650 can be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 620, removable storage 651 and non-removable storage 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media can be part of device 600.

Computing device 600 can also include an interface bus 642 for facilitating communication from various interface devices (e.g., output interfaces, peripheral interfaces, and communication interfaces) to the basic configuration 601 via the bus/interface controller 640. Example output interfaces 660 include a graphics processing unit 661 and an audio processing unit 662, which can be configured to communicate to various external devices such as a display or speakers via one or more A/V ports 663. Example peripheral interfaces 660 include a serial interface controller 671 or a parallel interface controller 672, which can be configured to communicate with external devices such as input devices (e.g., keyboard, mouse, pen, voice input device, touch input device, etc.) or other peripheral devices (e.g., printer, scanner, etc.) via one or more I/O ports 673. An example communication interface 680 includes a network controller 681, which can be arranged to facilitate communications with one or more other computing devices 690 over a network communication via one or more communication ports 682. The Communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 can also be implemented as a personal computer including both laptop computer and non-laptop computer configurations.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A method for communicating over a wireless network, comprising:
   receiving a packet stream at a first node, the packet stream comprising Transmission Control Protocol (TCP) packets;
   identifying a subset of packets of the packet stream, the identifying comprising identifying at least one of a TCP acknowledgement (ACK) packet, a Request to Send (RTS) packet, a Clear to Send (CTS) packet, or a packet bearing an urgent pointer;
   generating at least one copy of a packet of the subset of packets;
   determining a first route for transmitting packets of the packet stream other than the subset of packets from the first node to a second node;
   determining a second route for transmitting the subset of packets from the first node to the second node; and
   determining a third route for transmitting the at least one copy of a packet from the first node to the second node;
   wherein the first route is different than the second route and the third route is different than both the first route and the second route.

2. The method of claim 1, wherein the first node and the second node comprise the wireless network, the wireless network comprises a wireless ad hoc network including the first node and the second node.

3. The method of claim 1, wherein the first node and the second node comprise the wireless network, the wireless network comprises a wireless mesh network including the first node and the second node.

4. The method of claim 1, wherein the determining the first route comprises performing a multipath routing algorithm using a first value for a weighting variable.

5. The method of claim 1, wherein the determining the second route comprises performing the multipath routing algorithm using a second value for the weighting variable.

6. The method of claim 1, wherein the identifying the subset of packets comprises identifying one or more important packets of the stream of packets.

7. An article comprising a computer program product having stored therein instructions that, if executed, result in:
   receiving a packet stream at a first node, the packet stream comprising Transmission Control Protocol (TCP) packets;
   identifying a subset of packets of the packet stream, the identifying comprising identifying at least one of a TCP acknowledgement (ACK) packet, a Request to Send (RTS) packet, a Clear to Send (CTS) packet, or a packet bearing an urgent pointer;
   generating at least one copy of a packet of the subset of packets; and
   determining a first route for transmitting packets of the packet stream other than the subset of packets from the first node to a second node;
   determining a second route for transmitting the subset of packets from the first node to the second node; and
   determining a third route for transmitting the at least one copy of a packet from the first node to the second node;
   wherein the first route is different than the second route and the third route is different than both the first route and the second route.

8. The article of claim 7, wherein the determining the first route comprises performing a multipath routing algorithm using a first value for a weighting variable.

9. The article of claim 7, wherein the determining the second route comprises performing the multipath routing algorithm using a second value for the weighting variable.

10. The article of claim 7, wherein the identifying the subset of packets comprises identifying one or more important packets of the packet stream.

11. A wireless communication system comprising:
    a wireless node including a processor and a wireless transceiver coupled to the processor;
    wherein the processor is capable of:
      receiving a stream of packets, the stream of packets comprising Transmission Control Protocol (TCP) packets;
      identifying a subset of packets of the stream of packets, the identifying comprising identifying at least one of a TCP acknowledgement (ACK) packet, a Request to Send (RTS) packet, a Clear to Send (CTS) packet, or a packet bearing an urgent pointer;
      generating a copy of a packet of the subset of packets; and
      determining a first route for transmitting packets of the stream of packets other than the subset of packets to another wireless node;
      determining a second route for transmitting the subset of packets to the other wireless node; and
      determining a third route for transmitting the copy of a packet to the other wireless node;
      wherein the first route is different than the second route and the third route is different than both the first route and the second route.

12. The system of claim 11, wherein the processor is further capable of determining the first route by executing a multipath routing algorithm with a first value for a weighting variable.

13. The system of claim 11, wherein the processor is further capable of determining the second route by executing the multipath routing algorithm with a second value for the weighting variable.

14. The system of claim 11, wherein the processor is further capable of identifying the subset of packets by identifying one or more important packets of the stream of packets.

15. A wireless network node comprising:
    a wireless transceiver; and
    a processor coupled to the wireless transceiver and configured to use the wireless transceiver to transmit packets to another wireless network node;
    wherein the processor is further configured to:
      identify at least one packet of a packet stream, the packet stream comprising Transmission Control Protocol (TCP) packets, wherein the identifying the at least one packet of the packet stream comprises identifying at least one of a TCP acknowledgement (ACK) packet, a Request to Send (RTS) packet, a Clear to Send (CTS) packet, or a packet bearing an urgent pointer;
generate a copy of the identified at least one packet; and
determine a first path for transmitting the packet stream to the other wireless node;
determine a second path, different from the first path, for transmitting the identified packet to the other wireless node; and
determine a third path, different than both the first path and the second path, for transmitting the copy of the identified packet to the other wireless node.

16. The node of claim 15, wherein the processor is further configured to determine the first path by executing a multipath routing algorithm with a first value for a weighting variable.

17. The node of claim 15, wherein the processor is further configured to determine the second path by executing the multipath routing algorithm with a second value for the weighting variable.

18. A method for communicating over a wireless network, comprising:
receiving a packet stream at a first node;
identifying a subset of packets of the packet stream;
generating at least one copy of a packet of the subset of packets;
determining a first route for transmitting packets of the packet stream other than the subset of packets from the first node to a second node, wherein the determining the first route comprises performing a multipath routing algorithm using a first value for a weighting variable;
determining a second route for transmitting the subset of packets from the first node to the second node; and
determining a third route for transmitting the at least one copy of a packet from the first node to the second node;
wherein the second route is different than the first route and the third route is different than both the first route and the second route.

19. The method of claim 18, wherein the wireless network comprises a wireless ad hoc network including the first node and the second node.

20. The method of claim 18, wherein the wireless network comprises a wireless mesh network including the first node and the second node.

21. The method of claim 18, wherein the determining the second route comprises performing the multipath routing algorithm using a second value for the weighting variable.

22. The method of claim 18, wherein the identifying the subset of packets comprises identifying one or more important packets of the stream of packets.

23. An article of manufacture comprising a computer program product having stored therein instructions that, if executed, result in:
receiving a packet stream at a first node;
identifying a subset of packets of the packet stream;
generating at least one copy of the subset of packets;
determining a first route for transmitting packets of the packet stream other than the subset of packets from the first node to a second node, wherein the determining the first route comprises performing a multipath routing algorithm using a first value for a weighting variable;
determining a second route for transmitting the subset of packets from the first node to the second node; and
determining a third route for transmitting the copy of the subset of packets from the first node to the second node;
wherein the first route is different than the second route and the third route is different than both the first route and the second route.

24. The article of claim 23, wherein the determining the second route comprises performing the multipath routing algorithm using a second value for the weighting variable.

25. The article of claim 23, wherein the identifying the subset of packets comprises identifying one or more important packets of the packet stream.

26. A wireless communication system, comprising:
a wireless node including a processor and a wireless transceiver coupled to the processor;
wherein the processor is capable of:
receiving a stream of packets;
identifying a subset of packets of the stream of packets;
generating a copy of the subset of packets;
determining a first route for transmitting packets of the stream of packets other than the subset of packets to another wireless node by executing a multipath routing algorithm with a first value for a weighting variable;
determining a second route for transmitting the subset of packets to the other wireless node; and
determining a third route for transmitting the copy of the subset of packets the other wireless node;
wherein the first route is different than the second route and the third route is different than both the first route and the second route.

27. The wireless communication system of claim 26, wherein the processor is further capable of determining the second route by executing the multipath routing algorithm with a second value for the weighting variable.

28. The system of claim 26, wherein the processor is further capable of identifying the subset of packets by identifying one or more important packets of the stream of packets.

29. A wireless network node comprising:
a wireless transceiver; and
a processor coupled to the wireless transceiver and configured to use the wireless transceiver to transmit packets to another wireless network node;
wherein the processor is further configured to:
identify at least one packet of a packet stream;
generate a copy of the identified packet;
determine a first path for transmitting the packet stream to the other wireless node by executing a multipath routing algorithm with a first value for a weighting variable;
determine a second path, different from the first path, for transmitting the identified packet to the other wireless node; and
determine a third path, different than both the first path and the second path, for transmitting the copy of the identified packet to the other wireless node.

30. The node of claim 29, wherein the processor is further configured to determine the second path by executing the multipath routing algorithm with a second value for the weighting variable.

* * * * *

UNITED STATES PATENT AND TRADEMARK OFFICE
CERTIFICATE OF CORRECTION

PATENT NO. : 8,582,502 B2  
APPLICATION NO. : 12/478614  
DATED : November 12, 2013  
INVENTOR(S) : Conte Page 1 of 2

It is certified that error appears in the above-identified patent and that said Letters Patent is hereby corrected as shown below:

In the Drawings:

In Fig. 6, Sheet 4 of 4, in Box "615", in Line 1, delete "Controler" and insert -- Controller --, therefor. (see attached)

In the Claims:

In Column 12, Line 2, in Claim 7, delete "packets; and" and insert -- packets; --, therefor.

In Column 12, Lines 34-35, in Claim 11, delete "packets; and" and insert -- packets; --, therefor.

In Column 13, Line 3, in Claim 15, delete "packet; and" and insert -- packet; --, therefor.

In Column 14, Line 37, in Claim 28, delete "system" and insert -- wireless communication system --, therefor.

In Column 14, Line 40, in Claim 29, delete "node" and insert -- node, --, therefor.

Signed and Sealed this  
Thirteenth Day of May, 2014

Michelle K. Lee  
*Deputy Director of the United States Patent and Trademark Office*

FIG. 6